United States Patent [19]
Weinstein

[11] 3,790,122
[45] Feb. 5, 1974

[54] ZONE CONTROL VALVE ASSEMBLY
[75] Inventor: Richard Weinstein, Evanston, Ill.
[73] Assignee: International Telephone and Telegraph Corporation, New York, N.Y.
[22] Filed: Apr. 17, 1972
[21] Appl. No.: 244,709

Related U.S. Application Data
[63] Continuation-in-part of Ser. No. 80,011, Oct. 12, 1970, Pat. No. 3,711,060.

[52] U.S. Cl. .................. 251/11, 236/68 R, 74/110, 251/330
[51] Int. Cl. ............................................ F16k 31/00
[58] Field of Search .... 236/68 R; 251/11, 214, 330, 251/138; 277/9, 9.5; 137/315; 60/23 X; 74/110 X, 104

[56] References Cited
UNITED STATES PATENTS
3,297,054  1/1967  Nielsen et al. .................. 251/330 X
3,482,624  12/1969  Carlson et al. .................. 251/11 X Primary Examiner—William E. Wayner
Attorney, Agent, or Firm—James B. Raden; Marvin M. Chaban

[57] ABSTRACT

Valve assembly for zone control valves of the type employed in hydronic temperature control systems. The valve incorporates a control unit which can readily be separated from the valve structure without emptying fluid from the system. An improved sealing structure protects the valve itself and allows the separation noted above and permits sealing structure itself to be replaced without emptying system fluid. In this way, the control unit and the valve seals can be replaced readily in the field, are long-lived, and capable of continuous trouble-free usage. Variations in the control of the heating system are also shown.

6 Claims, 10 Drawing Figures

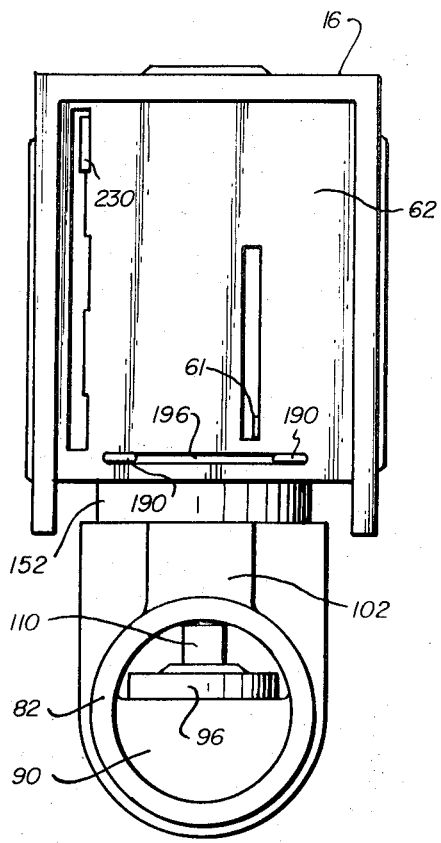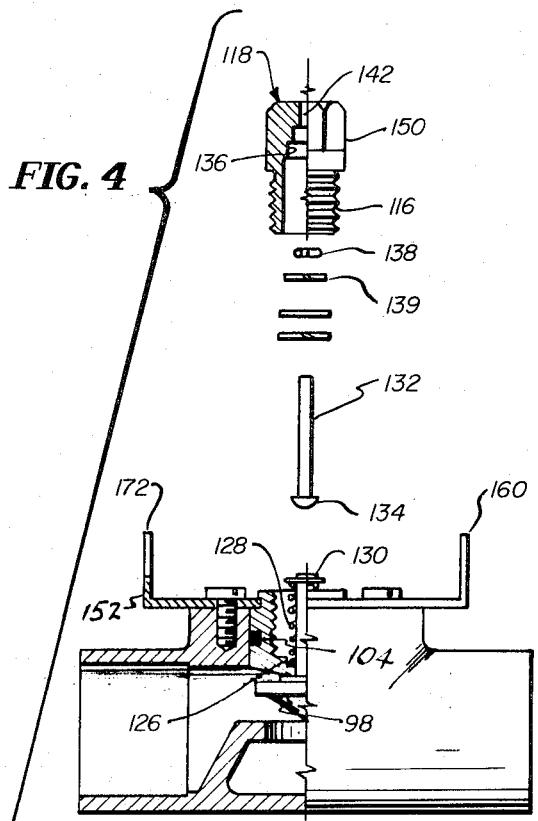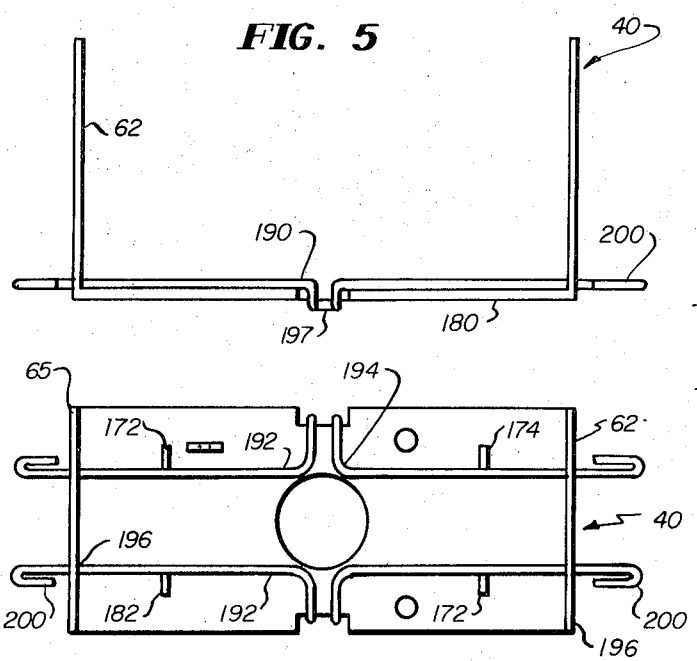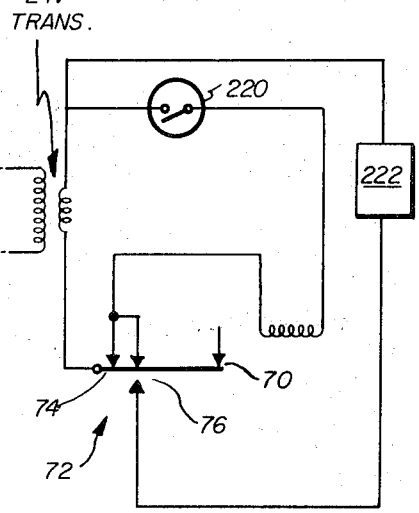

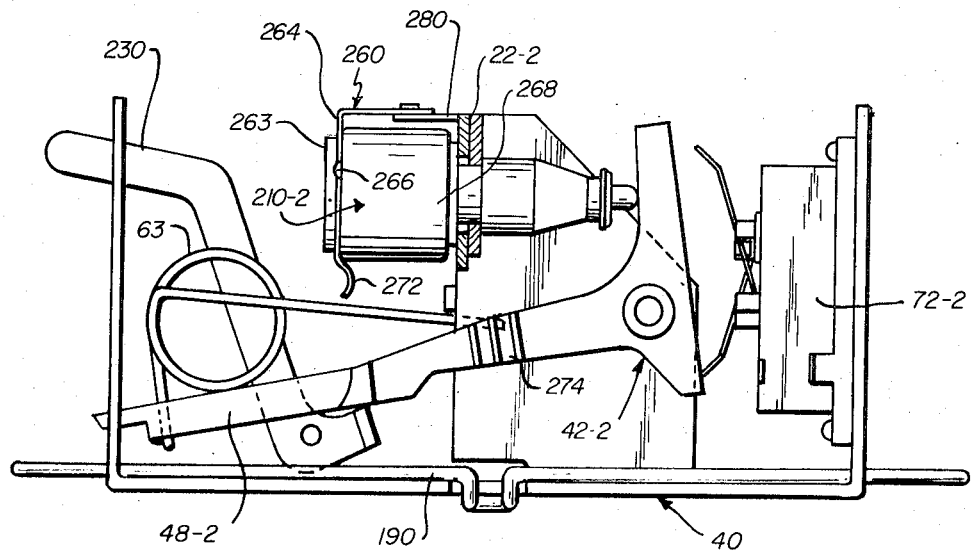
FIG. 8
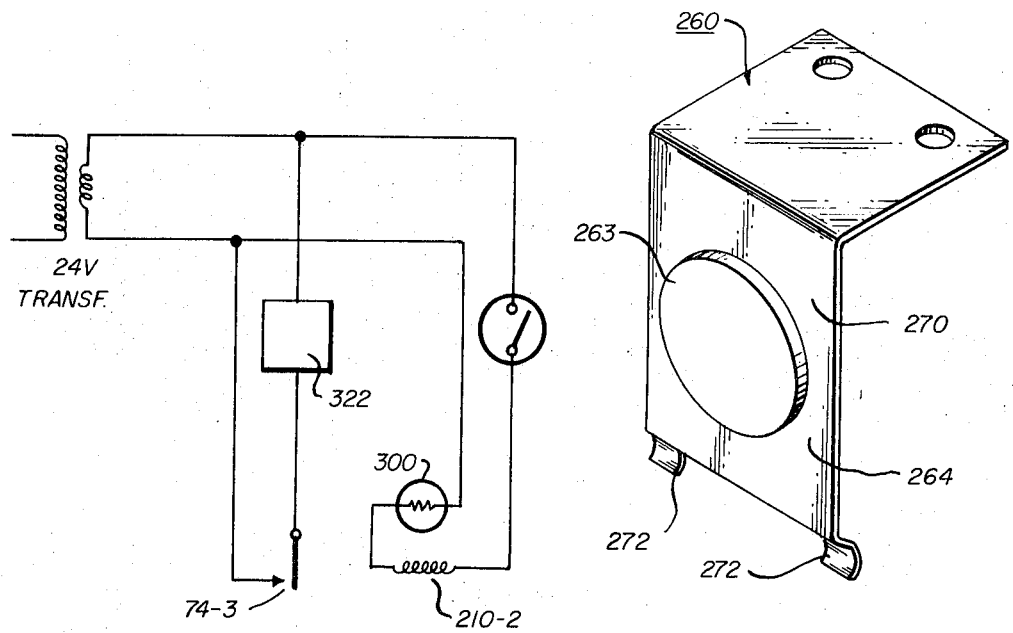
FIG. 10
FIG. 9

ZONE CONTROL VALVE ASSEMBLY

The present invention comprises a continuation-in-part of my co-pending application Ser. No. 80,011 filed on Oct. 12, 1970 now U.S. Pat. No. 3,711,060.

BACKGROUND OF THE INVENTION

This invention relates to hydronic temperature control systems. More particularly, it relates to zone control valves and valve units for use in such systems.

A zone control valve is a device which regulates the flow of fluids or liquids, which may be either heated or cooled, as a function of the temperature sensed by a thermostatic sensor. The valve opens or closes to control the flow volume, in response to the temperature sensed by the thermostatic sensor.

Present day hydronic temperature control systems utilize these zone control valves to regulate the flow of heated or cooled fluid through the coils of heat exchangers which are employed for either heating or cooling specified areas or zones. Because of the regulatory effect of the zone control valves, the temperatures of the zones served by the exchangers are effectively controlled.

The zone valves are frequently constructed as a combination of a heat expansible motor assembly which actuates a piston extending through a wall seal to a valve. As a suitable thermostatic sensor senses the need for an increase in the temperature in the zone to be controlled, the heat expansible motor assembly is caused to operate, if necessary, and the motor causes the valve stem or rod to move, thus adjusting the position of the valve.

In known zone valves of the type described, it has been commonplace to use a number of different devices such as diaphragms, metal bellows and the like for sealing the wall port where the actuating rod moves through the wall to translate the motion of the motor to the valve. However, some problems have arisen due to the sealing devices employed heretofore. For example, the diaphragms have tended to experience mechanical fatigue responsive to actuation of the valve assembly, thus causing relatively short usable life spans therefor. The use of bellows, whether metal or elastomeric, has entailed considerable tooling and raw material expense, has tended to be more costly than is desirable considering the total value of the entire valve assembly. The metal bellows also tends to encounter mechanical fatigue problems. In addition, the metal bellows has required unique treatment for sealing metal to metal such as the installation of gaskets, O-rings, cement and the like. Furthermore, the requirements for sealing the diaphragm or metal bellows to the wall of the valve have introduced a number of assembly and maintenance problems, thus increasing the cost of manufacture and the cost of maintaining the unit.

SUMMARY OF THE INVENTION

My invention comprises an improved automatic fluid control valve. This valve permits great ease of installation, maintenance, and manufacturing coupled with sophisticated operation not seen in similar valves.

The body of the valve may be installed into a fluid line without the seat assembly. After threading or soldering, the moveable seat and seal assembly are inserted into the valve body where a static seat O-ring is engaged and two screws hold assembly to body. The valve is normally open so that mechanic can check entire piping loop.

The drive assembly (motor operated) is slipped onto valve body where it is "snapped" firmly onto the body. This allows easy installation in hard-to-get areas where screws would be difficult to use. Conversely, if the drive unit has to be removed from valve body one merely squeezes the protruding levers (at each end of unit) together, and lifts the drive unit easily from body and seat assembly.

The seat assembly is spring loaded in the open position. When the drive unit is snapped onto the body, it depresses a pin, which protrudes from seat assembly, thereby pressing a rubber disc against the valve seat and prevents any flow through the valve.

When the valve is to be opened, energy is provided to the heat motor which extends its piston to move a pivotal lever. As the lever rotates about its fulcrum, it operates electrical contacts. The lever also deflects a spring while allowing the pin to be raised from the valve disc and thereby permitting the valve to assume its open position. A torsion spring is used, the spring being moved slightly in a winding direction on extension of the heat motor and increases the original force required by the motor to begin deflection of the force-opposing structure, but requiring less overall force to fully activate the valve.

When one wishes the valve to close, energy is removed from the heat motor. The torsion spring is now moved in its unwind direction to restore the lever so that the valve pin is pressed down thereby closing the valve seat, and the heat motor piston is retracted into the heat motor.

The valve has a manual lever protruding from the drive assembly. This lever may be pressed down and locked. The lever mechanically lifts the main operating lever, which depresses the spring and allows valve pin to assume an open position.

Whenever the main operating lever moves up or down it positions an indicator outside the drive unit which allows a visual indication of whether the valve is open or closed.

Finally, if the seal through which the valve pin moves should become worn and leak, one may remove the drive unit and unscrew the entire pin-seal assembly. This may be done without regard to fluid in the system, since as the assembly is removed, the rubber seating disc is raised up by spring tension and closes the small port area which is exposed to atmosphere, thereby preventing any leakage from the valve. A new pin-seal assembly may be screwed into place, also without leakage from valve.

Of further interest is the heat motor and its method of control. Most valves employing this type of drive unit apply heat to the motor with an electric resistance heater. When heat has caused the piston to extend to a given distance, the piston, which has been causing the valve to open, also opens an electrical switch which breaks the circuit to the heater. The heat motor now begins to cool, and the piston is slowly pressed back into the motor thereby closing the switch and making electrical contact to the heater once again. The piston, in effect, oscillates between a fixed range causing the valve to also open and close partially.

My valve employs a new and improved method of controlling heat to the heat motor.

One approach I use is to employ a heater whose resistance is responsive to temperature. This method uses various materials such as stainless alloys (heating wire) whose resistance can change greatly as the temperature increases, and also may include in proximity to the heater components such as thermistors or the like.

This method is superior to those using switches, because when a given predetermined temperature is reached by the heater, the piston of the heat motor has advanced to its actuated position. At this point, the resistance of the heater has increased and caused the heat to stabilize (self-limiting) so that the piston is stopped within close tolerances, and does not modulate in and out.

My system also has an alternate method, whereby the heater is physically separable from the heat motor (but is spring loaded to normally contact the heat motor). At the predetermined temperature reached by the heat motor, the piston extends from the heat motor, thereby rotating the lever about its fulcrum. The lever moves into contact with the heater to separate the heater from the motor at a given point in the lever movement. The lever has heat dissipating fins and so removes much of the heat from the heater and thereby stabilizing the flow of heat to the heat motor. This method will tend to slow or stop the piston from further movement. If, however, the external (ambient) conditions do not allow enough heat to be channelled into the lever, continued movement of the lever will physically lift the heater away from any contact with the heat motor; thereby limiting any further piston movement.

This method also prevents oscillation of the piston and greatly expands the operational life of the heat motor. In addition, by eliminating electrical switches, I eliminate one major cause of shortened switch life arising due to continuous arcing, caused by very slow make and break of the switching contacts.

Accordingly, an object of this invention is to provide a new and improved zone control valve and control unit therefor.

A further object is to provide an improved zone valve having new and improved sealing assemblies allowing separation of the operating motor from the valve unit.

Yet another object of the invention is to provide a control unit for the valve with a minimum of metal-to-metal contact between the control unit and the flow passage and has an insulating airspace therebetween.

A still further object of the invention is to provide a thermostatically controlled valve structure with a bias force on the motor which causes operation of its controlled contacts in response to comparatively low motor operating forces.

Yet another object of the invention is to provide zone control valves having an alternately positioned sealing member which allows ready removal of the main seal, if necessary.

These and other objects, features and advantages of my invention and the manner of obtaining them will become more apparent, and the invention itself will be best understood by reference to the following description of the preferred embodiment of the invention taken in conjunction with the accompanying drawings.

BRIEF DESCRIPTION OF THE DRAWINGS

FIG. 3 is an end view in elevation of the assembly of FIGS. 1 and 2;

FIG. 4 is a side elevation, partially sectioned and partially exploded showing the valve unit of FIGS. 1–3;

FIG. 5 is a side view in elevation of the main support bracket for the control motor unit;

FIG. 6 is a plan view of the bracket of FIG. 5;

FIG. 7 is a schematic circuit diagram for the embodiment of FIGS. 1–6;

FIG. 8 is a side view in elevation of the control motor assembly showing a second embodiment of my invention;

FIG. 9 is a prospective view of a heater element holder as used in the embodiment of FIG. 8; and FIG. 10 is a schematic circuit diagram as usable in a third embodiment of the invention.

DESCRIPTION OF THE PREFERRED EMBODIMENTS

Figure 1:
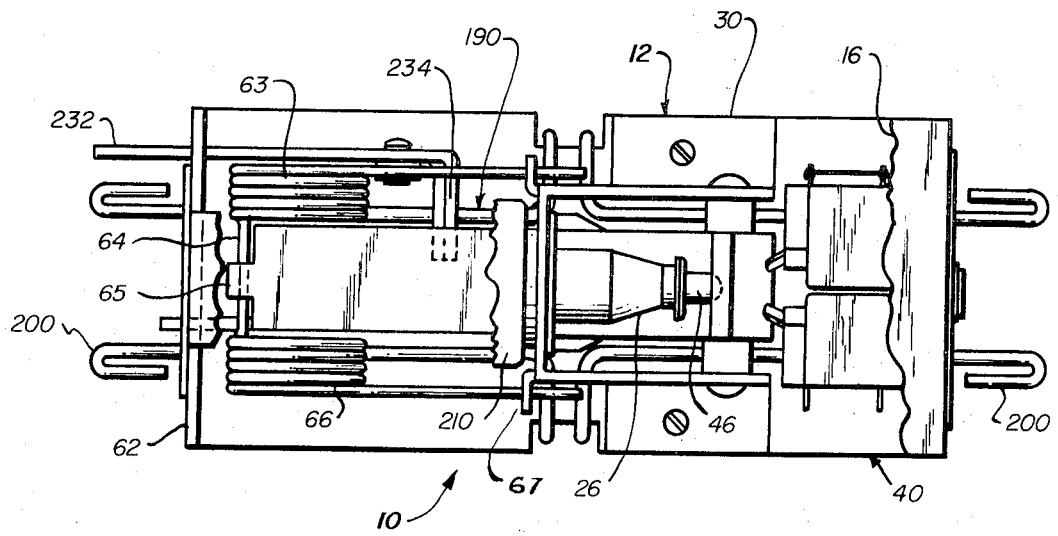
FIG. 1 is a plan view in elevation of my zone control valve assembly.
Figure 2:
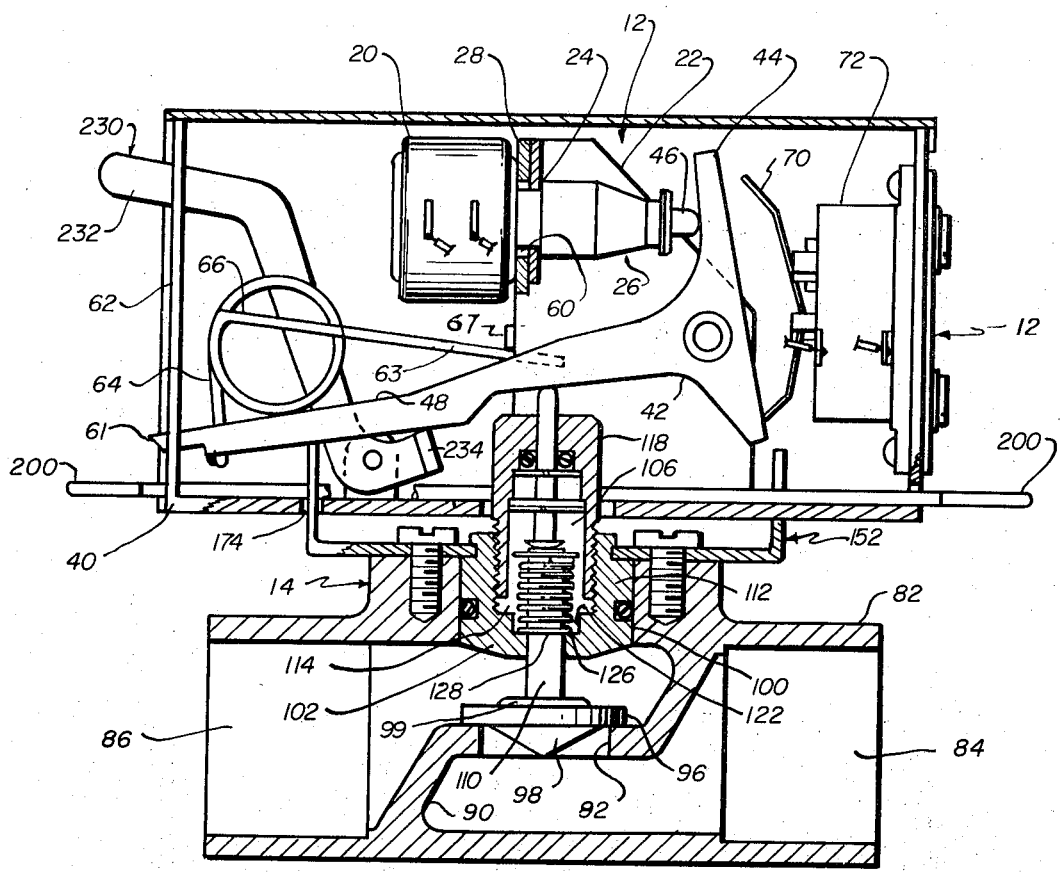
FIG. 2 is a side view of the valve assembly of FIG. 1, with the valve unit partially broken away to show the interior thereof.

FIGS. 1 and 2 show a first embodiment of my zone control valve assembly 10 using the teachings of my invention. More particularly, the major units of this valve assembly 10 can be considered in two parts, that is, a control unit 12 and a valve unit 14. The control unit 12 positions the valve responsive to ambient conditions sensed by a remote temperature sensor. The valve unit 14 comprises a poppet valve assembly including a valve body, inlet and outlet ports and a valve sealing means.

The control unit is protected from dirt and dust by a suitable dust cover 16 shown in FIG. 3, which may be fabricated of sheet material or the like. The control unit used herein is of the heat motor-actuated type which includes a heat motor assembly 20 mounted for horizontal movement within a suitable U-shaped motor mounting bracket 22. A suitable opening 24 is provided in the motor bracket to receive the motor piston guide 26. The motor is secured to the bracket by means of a retaining washer 28 fitted within an annular depression in the piston guide 26 and restraining the motor firmly against the back of bracket 22. The bracket 22 is secured to the assembly by means of outwardly extending feet 30 which rest on a main support member 40 which comprises a substantially U-shaped metal bracket with its long dimension extending parallel to the direction of flow through the valve unit.

Pivotally mounted to the legs of the U-bracket 22 is bell crank 42, whose short lever arm 44 is operably positioned adjacent the piston 46 of the heat motor assembly 20. The long lever arm 48 of bell crank 42 extends through a suitable aperture 60 in bracket 22, which allows movement of arm 48. At the outermost end an elongation of the long lever arm 48 provides an indicating finger 61 which protrudes through a slot in vertical end plate 62 of main member 40. Biasing lever arm 48 is a comparatively heavy torsion spring 63. The spring has two spaced coils separated by a U-shaped section 64 which rests within a suitable slot 65 in arm 48 of bell rank 42. The outer wire wing 66 of each coil of spring 63 rests under a suitable stationary retaining ear and within cutouts under tabs 67 on bracket 22. The spring 63 maintains bell rank 42 in the position shown in FIG. 2 maintaining the valve closed to flow. Spring 63 is configured to wind on operative movement of original bell crank and thereby increases the force which must be exerted by motor assembly 20 to deflect the bell crank. As the motor-induced force increases, the torsion spring extension arms 64 tend to slide under tabs 67 and move the torsion spring coil toward the bell crank pivot. This movement tends to decrease the effective lever distance from the bell crank pivot and thereby reduce the resistance of the torsion spring to movement of the bell crank.

Adjacent the outer side of bell crank lever arm 44 is the operating wire lever spring 70 of an enclosed switch member 72, there being either one or two such switch members aligned adjacent one another. The switch members include a make combination 76 which will be called herein the auxiliary combination, and need only be used in certain installations. A break combination 74, called herein the main spring combination, or motor limit switch is actuated by the movement of bell crank 42 to open the circuit to the motor.

The valve unit 14 is generally defined by a tubular valve body 82 having an inlet port 84 at one end and an outlet port 86 at the other end, the two ports being coaxially aligned with one another. A bulkhead 90 separates the ports in an offset configuration between the inlet port and the outlet port. Centrally located in the bulkhead is a circular opening 92 whose diameter is generally parallel to the direction of flow into and out of the tubular valve body. Opening 92 comprises a circular valve seat within the bulkhead 90 allowing communication between these ports.

Seated in the opening of the valve seat is a self-aligning seat disc 96 which, preferably, has a coating of elastomeric material and has a central conic tip 98 entrant into the circular opening 92 to open and close the valve. The upper inner section of disc 96 has an annular sealing rib 99 as will be explained later. The valve unit further has a valve opening 100 perpendicular to the flow into and out of the tubular ports and aligned coaxially with the valve seat opening 92. Within the valve opening 100 is mounted a tubular, metallic sealing plug 102 which is tightly fitted into the opening and sealed therein by means of an O-ring 104 resting within an annular ring well on the plug outer wall. Within the central cavity 106 of the sealing plug is aligned the valve operating stem 110. This stem is affixed to the valve disc 96 to condition the disc in either a first position blocking flow (as seen in FIG. 2) or a second position allowing flow through the valve seat as shown in FIG. 4.

The sealing plug 102, as shown best in FIGS. 1 and 4, comprises two metallic mating members, the first being an outer lower plug member 112 which abuts the valve opening 100 and is sealed thereagainst by means of the O-ring 104 previously referred to. The lower member has upwardly directed central cavity 114 suitably threaded to receive the external threading 116 on the second member 118, an upper gland or shell member. Within cavity 114 the lower member 112 has a cuplike wall 122 with a shoulder 126 which holds one end of compression spring 128 about the valve stem. The stem has a ring groove near its upper end holding a metal O-ring to compress spring 128 and provide a normal upward bias on the valve tending to open the valve relative to the valve seat, and to close the sealing rib 99 against the underside of cup-wall 122. The valve stem has at its upper extremity a central depression 130 which supports the head of a lever operating rod 132.

The head 134 of the rod rests within depression 130 and its body extends upwardly.

Within the upper shell member 118 is formed a central O-ring receiving cup 136 about the operating rod opening 142. Cup 136 supports primary sealing members which form a sealing action between the cup and the body of lever operating rod 132. The sealing ring comprises an elastomeric washer 138 and a metal washer 139. The space below washer 139 may be filled with a silicone grease, as seen in FIG. 2. Of course, the head 134 of rod 132 is larger than the diameter of the rod opening 142 within cup 136, such that the rod is retained within the sealing plug 102 in vertical alignment with the valve stem 110.

The upper sealing ring or washer 138 is one which is designed to fit tightly about the lever operating rod 132, and provides the major sealing of the control unit 12 from the valve assembly 10.

The upper shell member has at its upper end an enlarged hex head 150 which fits loosely within a central opening in a coupling bracket 152. The bracket 152 has a circular opening sized to receive the external boss of member 100 and may be brazed, sweated or otherwise affixed thereto. Two screws mating into holes in the valve body may act to complete the mounting of bracket 152 to the valve assembly.

With this construction, the bias imposed by spring 128 tends to raise the valve stem and valve 96 out of the valve seat, opening the valve to flow.

The coupling bracket 152 serves to mate the control unit 12 to the valve body 14 in the following manner: Bracket 152 has a main body 158 with parallel mounting arms 160 at the opposed ends of the body 158. Each arm 160 has a horizontally disposed medial shoulder 170 and vertically extending therefrom at its ends spaced fingers 172. Fingers 172 protrude through suitable passages 174 in the main support member 40. With the fingers fully extended through the passages, the main body 180 of support member 40 abuts against shoulders 170. To firmly hold this mating relationship, each of the fingers 172 has a horizontally extending lug 182 which forms therebelow a hook opening spaced above the main body 180. These hook openings receive suitable wire restraining members 190. To firmly hold the mating relationship, two wire restraining members are used. These members each have a straight portion 192 extending within the hook openings under lugs 182. Adjacent the hex head 150 of the upper shell member, each member 190 has an ear 194 spaced from the hex head 150 and downturned about a suitable notch 197 in the main body 180. The straight portion of each restraining member extends through a suitable slot 196 in the upstanding walls or end plates 62 of support member 40 and each end terminates in a formed J-shaped end 200 which allows the wires to be readily grasped and depressed one toward the other. By depressing the wire restraining members one toward the other, they free the engagement of the hook openings 184 by forming a lever action about the bend 194. By removing the mating of the wire restraining members and the hook openings the control unit 12 may be readily detached from the valve unit 14.

The heat motor assembly 20 may be any heat expansible motor including a high pressure casing, a heater unit 210, a heat expansible material such as paraffin, solid wax and the like, a container to hold the expansible material and a piston rod 46. The piston rod 46 is actuated by the expansible material being heated by the heater unit 210, the heater being controlled by the limit switch mechanism of the switch actuator bell crank 42.

The valve unit is of globe type design. The inlet 84 of valve unit 14 is connected to a supply pipe-line providing either hot or cold fluid. The outlet 86 is connected to a pipe-line leading to the fan coils or other heat exchanging means located in the temperature controlled zone. The valve seat disc 96 is coated with long-wearing, water and corrosion resistant elastomeric material providing a self-aligning, resilient, renewable pressure seal surrounding the valve stem 110. The seat disc is engaged by return or closure spring 128 which is compressed between the wall of cup 122 in the stem plug body 102 and holding washer 130.

In greater detail, the valve assembly 10 may be mounted in a hydronic system in a manner such that the ports, inlet 84 and outlet 86, of the valve assembly 10 are connected to pipe-lines leading to fan coils or other heat exchanging means located in the temperature controlled zone. A thermostat 220 (FIG. 7) is positioned in the temperature controlled zone to control operation of the valve assembly 10 as a function of the temperature in the zone. When the thermostat 220 calls for either heating or cooling, it contacts close to low voltage power (e.g., 24 volts as shown in FIG. 7) to the heater unit 210 of heat motor assembly 20 thus heating the expansible material therein. When the heat motor assembly 20 reaches operating temperature, the heat expansible material expands and exerts pressure on piston 46 forcing the piston to move outwardly depressing switch actuator bell crank 42. Bell crank 42 pivots against the effect of spring 63 which tends to unwind decreasing the motor force necessary to allow the bell crank 42 to move to its valve opening position. As the actuator bell crank 42 is depressed by piston 46, it pivots causing actuator rod 132 to release its downward force on valve stem 110. Thereby, valve stem 110 is released and restores upwardly under the bias imposed by spring 128 and fluid pressure. Upward motion of valve stem 110 causes disc 96 to move. Consequently, the valve seat disc 96 is raised out of the valve opening 100 thereby opening the valve to permit flow of temperature determining fluid through the system.

Also, on movement of bell crank 42, spring 70 is deflected closing the make combination 76 to any outside circuit 222 and opening the limit switch of the break-make combination 74, thereby opening the circuit to the heater unit 210, thereby de-energizing the heater. The heater cools down and the bell crank 42 restores under the bias of spring 63 to override the bias of spring 128 and return the assembly to its normal condition with the valve preventing flow between ports, providing the thermostat is in its satisfied condition.

Further, within FIGS. 1 and 2, there is shown an offset manual control lever 230. This lever has an operating handle 232 extending past the main support end plate 62. The lever 230 is pivotally mounted above the main support 40 and has an offset portion 234 positioned under lever arm 48 of bell crank 42. Normally, the compressive force of spring 63 maintains the bell crank long lever arm 48 depressed and thereby maintains offset 234 depressed, and handle 230 elevated.

In case of an operator malfunction, the manual lever may be pivoted downwardly manually to an intermediate position partially opening the valve unit but not affecting the switching assembly. This lever 230 cocks bell crank 42 to an intermediate position, allowing the valve stem to rise partially. A suitable notch in the end plate 62 may be used to hold the handle in this position. The handle may be moved to its lowest level elevating the lever arm 48 and actuating the valve assembly fully, both as to switching member 72 and as to the valve itself. A notch in the wall of the end plate 62 may be used to maintain this condition.

As mentioned briefly previously, the sealing arrangement about the valve stem and valve rod comprises one of my inventive features. The upper or primary O-ring 138 has a tight-fitting relationship about the operating rod 132. The sealing arrangement allows the primary seal to be replaced without disabling the fluid flow system and without isolating the valve. The heater control unit is removed by release of the wire restraining members and subsequent lifting of the control unit, which relieves the downward force on the valve rod and valve stem 110 rises under the bias of spring 128. The gland or shell member 118 is unscrewed from the threaded body 116 of the lower plug member 112. The valve disc 96 rises opening the valve to flow between ports and the annular rib 99 in its upper surface is compressed by the action of spring against the underside of plug 102 sealing the plug against flow from the valve port. The primary O-ring 138 can thus be replaced and shell member or gland 118 restored without disabling the system.

Following such replacement of the sealing ring, the control unit can be restored to its operational positioning by placing the unit such that fingers 172 protrude through the slots in the main support, and the wire restraining members restored to position under the lugs 182 locking the control unit in operative position relative to the valve unit once again.

By using a torsional spring configured to wind slightly on deflection of bell crank 42 and slide therealong, a comparatively low valve actuating force on the part of motor 20 is required. The slope of force of the motor, if graphed, against deflection of indicator 61 would be steeper than with other forms of springs to result in less deflection of the crank at low motor force levels. However, when sufficient force has been generated to cause sliding of the torsion spring (as previously described), the slope of the curve will level out at a much flatter level. The effect of the torsion spring once that level has been reached is to resist the motor force considerably less. The enclosed figure on such a graph would be much lower in height and greater in length than a chart for a simple compression spring opposing the movement of bell crank 42. By using the torsion spring, a more positive output is produced with lesser motor drive force required. As a result, less strain on the motor is encountered and greater motor life.

The torsion spring also embodies the principle of producing a relatively constant load (once the deflection level is reached), by lengthening the moment arm of its two straight ends 63 under the retaining ears of bracket 22 as the bell crank pivots in a manner which tends to wind up the spring.

In FIG. 8, I show a second embodiment of my invention. In this embodiment, the valve unit is identical to that previously shown. The control unit is identical to that previously shown except for the spring pile-up, the heater motor and the bell crank.

In switching arrangement 72-2 (the final 2 designating the second embodiment), the break-make combination 76, called previously the limit switch, has been omitted. In the prior embodiment, this switch once opened responsive to movement of the motor piston opened the circuit to the motor heater.

In this second embodiment, heater unit 210-2 comprises a heater such as a pelletized heater roughly wafer-shaped suitably affixed to flat spring holder 260. The holder is mounted to the bracket 22-2 and extends freely above the motor body. Holder 260 has a heater 263 adjacent the rear surface 266 of the motor body 268 and terminates in spaced detent members 270 at its lower end. The detent 270 is poised about a curved cam surface 272 on or incised in the long lever arm 48-2 of bell crank 42-2. It is preferable that cam surface 272 be a heat conductive member to draw heat from the heater to the mechanical structure of the central unit. Cooling fins 274 may also be provided in the lever arm 48-2 to aid in dissipating heat, as will be described.

The heating unit 210-2, as mentioned, is pelletized and is secured to holder 260 in its enlarged portion 264 facing the rear surface 262 of the motor. The holder is secured to the mounting bracket at points 280.

In this embodiment, when the thermostat (not shown) is closed to complete a direct path to the heater unit 210-2, the heater heats the motor until the time the piston 46-2 projects to pivot the bell crank 42-2. The lower arm 48-2 of the bell crank rises and cam surface 272 engages the detent member 270 to physically draw the heater unit 210-2 away from the motor. The distance between the heater and motor allows the motor to cool, withdrawing its piston and restoring bell crank 42-2 to its normal position, due to the inherent spring characteristics of holder 260, and its mounting at brackets 280.

The third embodiment shown only in the circuit of FIG. 10 is identical to that of FIGS. 1 and 2, except that limit switch 76 (the break-make combination) is once again omitted. A thermistor or suitable temperature-sensitive resistor 300 is physically disposed in close proximity to the heater unit 210-2 and motor body. This thermistor 300 senses the rise in temperature caused by the heater and electrically increases its resistance to decrease the current flowing to the heater, thereby lessening its ability to heat. The parameters of the circuit would be selected to cause the resistance increase to occur after the motor had reached a predetermined temperature and had actuated its piston. In this way, the thermistor would effectively limit the further heat generated by the heater once the piston had been advanced.

A combination of the second and third embodiments could also be employed to provide both physical and electrical means for decreasing the heat generation of the heater once its effect on the motor and piston had been completed.

While there has been described what is at present thought to be the preferred embodiments of the invention, and it is understood that modifications may be made therein and it is intended to cover in the appended claims all such modifications which fall within the true spirit and scope of the invention.

I claim:

1. A control valve assembly comprising a valve body having an inlet and an outlet port, a passage communicating between said inlet and outlet ports, valve means mounted in said valve body for controlling fluid flow through said passage, stem means for positioning said valve means relative to said passage, temperature responsive means, output means operated by said temperature responsive means, said output means operatively engaging said stem means to open and close fluid flow through said passage, means responsive to the detachment of said output means for causing said valve means to prevent flow from said passage from reaching said stem means, wherein said temperature responsive means comprises a heat motor, and a driven member responsive to movement of said heat motor, and means preventing movement of said driven member at lower than a predetermined amount of force generated by said motor, said preventing means operative when said predetermined force is generated by said motor to assist said motor in moving said driven member.

2. An assembly as claimed in claim 1, wherein said driven member comprises a pivotal armed member, and said preventing means comprises a torsion spring.

3. An assembly as claimed in claim 2, wherein there is means holding said torsion spring against unwinding at lower than said predetermined force.

4. A fluid control valve comprising:

support structure, a valve body having an inlet, an outlet and a port communicating between said inlet and said outlet, a stem member mounted for axial movement within said body, said stem member having a valve disc mounted thereon for axial movement therewith to open and close said port, a motion transmitting member coupled to said stem member to axially move said stem member, a motor mounted on said support structure and having an element extensible therefrom on operation of the motor, said extensible element being operably adjacent said motion transmitting member to impart a moving force to the motion transmitting member responsive to extension of said element thereby to move said valve disc relative to said port, an electric switch having a plurality of contacts and a switch operating member for opening and closing said contacts in response to movement of said motion transmitting member, and bias means mounted to oppose movement of said motion transmitting member, said bias means configured to lessen its opposing movement force against said motion transmitting member when more than a predetermined force is applied by said motor extensible element to said motion transmitting member.

5. A valve as claimed in claim 4, wherein said motion transmitting member comprises a bell crank mounted pivotally with a first arm positioned adjacent the said element for response to the extension thereof, and a second arm, with said second arm being coupled to said stem member.

6. A valve as claimed in claim 5, wherein said bias means comprises a torsion spring, said spring engaging the second arm of said bell crank and said spring configured to wind responsive to extension of said element whereby to lessen the spring force opposing movement of said bell crank.

* * * * *